Oct. 25, 1949.          H. DORE          2,485,867
REVERSIBLE TRANSMISSION
Filed Jan. 7, 1946
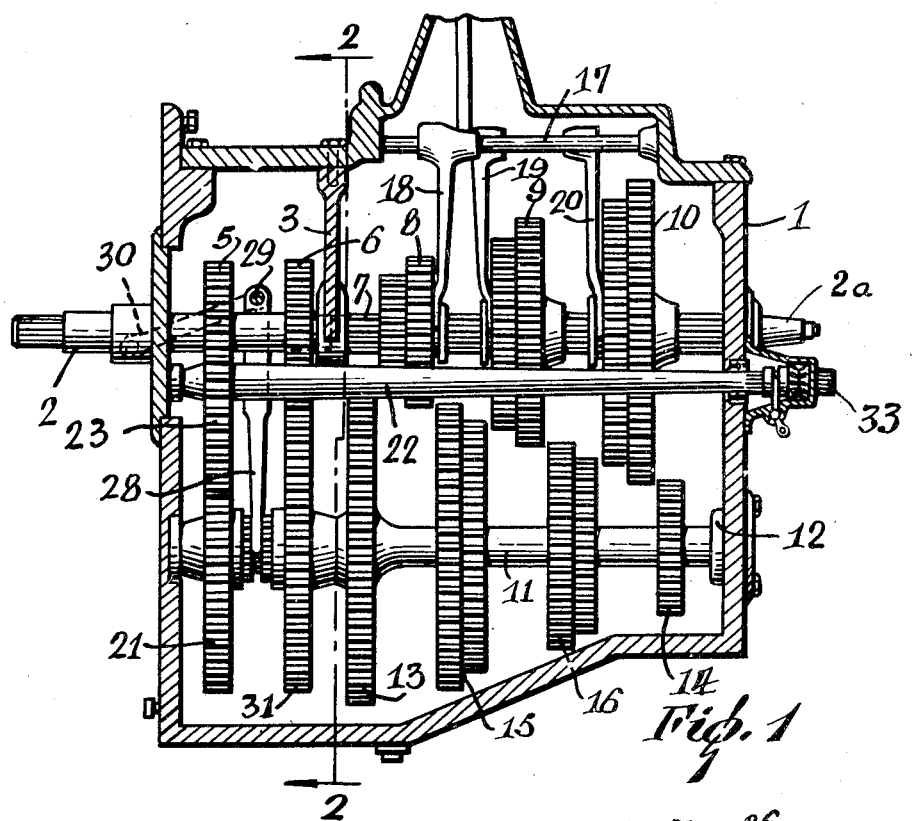
Fig. 1
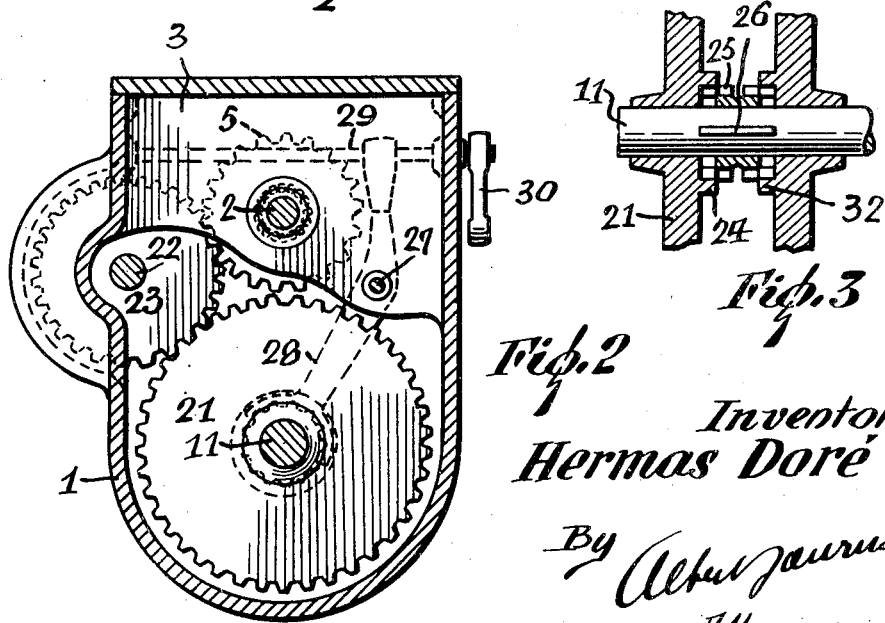
Fig. 2
Fig. 3
Inventor:
Hermas Doré

Patented Oct. 25, 1949

2,485,867

UNITED STATES PATENT OFFICE 2,485,867

REVERSIBLE TRANSMISSION

Hermas Doré, Montreal, Quebec, Canada

Application January 7, 1946, Serial No. 639,519

2 Claims. (Cl. 74—360)

1

The present invention pertains to a reversible transmission designed particularly for motor vehicle although not necessarily limited thereto.

The principal object of the invention is to provide several reverse speeds, as distinguished from the single reverse speed now ordinarily available in heavy motor vehicles.

The single reverse speed that is ordinarily provided is in low gear and consequently consumes a relatively large quantity of fuel and oil. It is frequently necessary to back up a heavy vehicle over a considerable distance, as in the case of narrow streets or alleys that do not permit turning the vehicle around and also in certain conditions on farms in connection with tractors. In such instances the invention effects a considerable economy in fuel, lubricant and time by providing reverse speeds in higher gear ratios.

Another object of the invention is to provide the several reverse speeds without the use of an additional transfer case. Instead, the usual transmission housing is somewhat enlarged to accommodate the additional gears necessary for the additional reverse speeds. This construction also reduces the number of levers necessary in the cab or the driver's compartment.

In the accomplishment of these objects, a conventional gear shift transmission applied various speed ratios to the driven or forward shaft in the usual manner. The invention includes, however, a reverse shaft with means for coupling to the forward shaft, regardless of the speed at which the latter is driven. The coupling between the two shafts is effected by means of meshing gears, one of which runs freely on its shaft but is locked thereto, when used, by a suitable clutch mechanism.

The invention is fully disclosed by way of example in the following description and in the accompanying drawings in which:

Figure 1 is a longitudinal section of the device;

Figure 2 is a section on the line 2—2 of Figure 1; and

Figure 3 is a detail longitudinal section.

Reference to these views will now be made by use of like characters which are employed to designate corresponding parts throughout.

In Figures 1 and 2 is shown a transmission housing 1 of suitable construction in which is journalled a power shaft 2 in the usual manner. The housing 1 is provided in its upper portion with a depending plate or web 3 which constitutes an additional bearing for the shaft 2 and also for an alined take-off shaft 2a, as may be seen by the dotted line at the web 3 in Figure 1.

2

The shaft 2 carries a pair of gears 5 and 6 fixed thereto, the former being slightly smaller than the latter for a purpose that will presently be described. Adjacent to the gears 5, 6, the shaft 2a is splined or fluted at 7 to support a series of sliding double pinions 8, 9 and 10. Each such pinion, as known in the art, is in fact a pair of pinions of unequal size fastened together or formed in one piece. Also, the double pinions 8, 9 and 10 vary in size to effect different speed ratios on the driven shaft.

The driven shaft 11 is suitably journalled in the housing 1 below the shafts 2, 2a and in parallel relation thereto. At one end the shaft 11 is preferably received in a removable bearing 12 for assembly purposes. The shaft 11 carries fixed gears 13 and 14 at the ends of the series of pinions 8, 9, 10 and are adapted to mesh respectively with smaller portion of the pinion 8 and the larger portion of the pinion 10 on proper adjustment of the latter. Between the gears 13 and 14 the shaft 11 carries a pair of double gears 15 and 16 adapted to be engaged by the adjacent parts of the pinions 8, 9 and 10 on shifting the latter. For the purpose of shifting the double pinions, a rod 17 is mounted in the housing 1 parallel and adjacent to shafts 2, 2a and carries a series of shifter forks 18, 19 and 20 attached respectively to the pinions 8, 9 and 10.

For reverse drive a reverse gear 21 is loosely mounted on the shaft 11 in the plane of the gear 5 but not in mesh therewith. Between the shafts 2, 2a and 11 and adjacent thereto, a reverse shaft 22 is journalled in the housing 1. The shaft 22 also carries an intermediate gear 23 meshing with the gears 21 and 5.

One side of the gear 21 is formed with a clutch face 24, and adjacent thereto a complementary clutch element 25 is splined at 26 on the shaft 11. A rod 27 mounted in the housing 1 parallel to the several shafts carries a shifter fork 28 engaging the member 25. The upper end of the fork is traversed by a rod 29 journalled in the housing 1 perpendicular to the several shafts and carrying an operating lever 30 externally of the housing. It is evident that the rotation of the rod 29 by means of the lever 30 shifts the member 25 to engage or disengage the clutch face 24 of the gear 21.

Adjacent to the gear 21, the shaft 11 carries another lose gear 31 of the same size as the gear 21 and meshing with the pinion 6 on the shaft 2. The gear 31 is formed with a clutch face 32 adjacent to the face 24 and also engageable by the clutch element 25. The latter, as shown in Figure 3, may engage either clutch face 24 or 32 or may lie idly between these faces and in engagement with neither. On engagement of the clutch element 25 with the face 32, the shaft 11 is driven from the shaft 2 and pinion 6 and drives the take-off shaft 2a at a speed determined by the selected double gears in mesh.

For reverse speeds the clutch element 25 is thrown into engagement with the face 24 of gear 21. The shaft 11 is now driven in reverse from the shaft 2 through gears 5, 23 and 28. The shaft 11 is selectively coupled to the shaft 2a through a selected pair of double gears, thus imparting reverse rotation to the shaft 2a at the selected speed.

Although a specific embodiment of the invention has been illustrated and described, it will be understood that various alterations in the details of construction may be made without departing from the scope of the invention as indicated by the appended claims.

What I claim as my invention is:

1. A reversible transmission comprising a drive shaft, a take-off shaft alined therewith, a driven shaft, means for driving said driven shaft from said drive shaft, said means including a reverse shaft, a reverse gear fixed to said reverse shaft, a reverse gear loosely mounted on said driven shaft and meshing with the first named reverse gear, and means for selectively locking the second named reverse gear to said driven shaft, unequal pinions slidably mounted on said take-off shaft, and unequal gears fixed on said driven shaft and engageable selectively by said pinions.

2. A reversible transmission comprising a drive shaft, a take-off shaft alined therewith, a driven shaft, means for driving said driven shaft from said drive shaft, said means including a reverse shaft, a gear fixed to said reverse shaft, a pair of gears fixed to said drive shaft, one of which meshes with said reverse shaft gear, a pair of gears loosely mounted on said driven shaft, one of which meshes with one of said drive shaft gears and the other of which meshes with said reverse shaft gear, and means for selectively locking the loosely mounted gears to said driven shaft, unequal gears slidably mounted on said take-off shaft, and unequal gears fixed on said driven shaft and engageable selectively by said pinions.

HERMAS DORÉ.

REFERENCES CITED

The following references are of record in the file of this patent:

UNITED STATES PATENTS

| Number | Name | Date |
|---|---|---|
| 2,334,958 | Rohkar | Nov. 23, 1943 |

FOREIGN PATENTS

| Number | Country | Date |
|---|---|---|
| 597,126 | Germany | May 17, 1934 |